UNITED STATES PATENT OFFICE.

EDWARD RILEY, OF 2 CITY ROAD, FINSBURY SQUARE, COUNTY OF MIDDLESEX, GREAT BRITAIN.

IMPROVEMENT IN MANUFACTURE OF REFRACTORY BRICKS, CRUCIBLES, &c.

Specification forming part of Letters Patent No. 218,315, dated August 5, 1879; application filed March 24, 1879; patented in England, November 23, 1878.

*To all whom it may concern:*

Be it known that I, EDWARD RILEY, F. C. S., of 2 City Road, Finsbury Square, in the county of Middlesex, Great Britain, do hereby declare the nature of the said invention, for improvements in the manufacture of refractory bricks, crucibles, and other articles, and also refractory linings for furnaces and converters, and in the preparation of lime to be molded into forms adapted to metallurgical and other uses, to be as follows:

This invention has for its object improvements in the manufacture of refractory bricks, crucibles, and other articles, and also refractory linings for furnaces and converters, and in the preparation of lime to be molded into forms adapted to metallurgical and other uses.

I prepare lime for these purposes in such manner that without converting it into hydrate of lime the lime is made plastic or coherent, or in such a condition that it may be used for the manufacture of bricks, crucibles, tuyeres, or any other form or shape used in furnaces or otherwise as a refractory lining. I also use lime in a plastic, soft, or moistened state for lining furnaces by means of ramming round a mold or core, as usually carried out in lining Bessemer converters, ladles, and steel-furnaces with ganister sand or any other refractory material.

Hitherto there has been great difficulty in using lime for molding bricks and the like, and for lining furnaces, on account of lime becoming hydrate of lime when moistened with water, in the usual way. I have discovered that when lime is mixed with crude petroleum-oil, petroleum-oil, or other like oils, or crude and waste products from the distillation of petroleum-oils, or tar free from, or practically free from, water, lime may be molded with or without pressure, but preferably with pressure. In this state it may be mixed with silica, oxide of iron, alumina, magnesia, or other materials, to make it more coherent after burning, as practiced in the manufacture of other refractory bricks.

After molding the bricks, or other forms or shapes, I heat the same in close vessels or retorts, so as to distill off the oils, so that they may be used again. The bricks or other form of fire-resisting materials are then to be burned or fired.

The petroleum-oil may be burned if it cannot be conveniently distilled.

I am aware that lime and mixtures of lime and limestone have been suggested and used for lining furnaces, and lay no claim to their use, my invention residing in the improved means of overcoming the practical difficulties of molding or using unhydrated lime or mixtures of unhydrated lime for lining furnaces, or making bricks, crucibles, or other shapes or forms.

What I claim as my invention is—

The process of preparing unhydrated lime for molding, by mixing it with oil practically free from water, all substantially as described.

EDWD. RILEY.

Witnesses:
   D. B. G. MACMILLAN,
      34 *Old Broad Street, London, E. C.*
   OTTO EDINGER,
      34 *Old Broad Street, London, E. C.*